MEANS FOR BY-PASSING A FAULT OF A LINE CIRCUIT AND FOR TELEPHONING TO RAILWAY TRAINS

Filed Dec. 11, 1947 7 Sheets-Sheet 1

INVENTORS.
Paul N. Bossart and
Elbert W. Marlowe
BY [signature]
THEIR ATTORNEY

INVENTORS.
Paul N. Bossart and
Elbert W. Marlowe
BY
THEIR ATTORNEY

INVENTORS.
Paul N. Bossart and
Elbert W. Marlowe
BY
[signature]
THEIR ATTORNEY

INVENTORS.
Paul N. Bossart and
Elbert W. Marlowe
BY
THEIR ATTORNEY

MEANS FOR BY-PASSING A FAULT OF A LINE CIRCUIT
AND FOR TELEPHONING TO RAILWAY TRAINS

Filed Dec. 11, 1947 7 Sheets-Sheet 5

INVENTORS.
Paul N. Bossart and
Elbert W. Marlowe
BY
[signature]
THEIR ATTORNEY

July 18, 1950 P. N. BOSSART ET AL 2,515,855

MEANS FOR BY-PASSING A FAULT OF A LINE CIRCUIT AND FOR TELEPHONING TO RAILWAY TRAINS

Filed Dec. 11, 1947 7 Sheets-Sheet 6

INVENTORS.
Paul N. Bossart and
Elbert W. Marlowe
BY [signature]
THEIR ATTORNEY

INVENTORS.
Paul N. Bossart and
Elbert W. Marlowe
BY
THEIR ATTORNEY

Patented July 18, 1950 2,515,855

UNITED STATES PATENT OFFICE 2,515,855

MEANS FOR BY-PASSING A FAULT OF A LINE CIRCUIT AND FOR TELEPHONING TO RAILWAY TRAINS

Paul N. Bossart, Cheswick, and Elbert W. Marlowe, Wilkinsburg, Pa., assignors to The Union Switch and Signal Company, Swissvale, Pa., a corporation of Pennsylvania Application December 11, 1947, Serial No. 791,070

4 Claims. (Cl. 179—2.5)

Figure 1A:
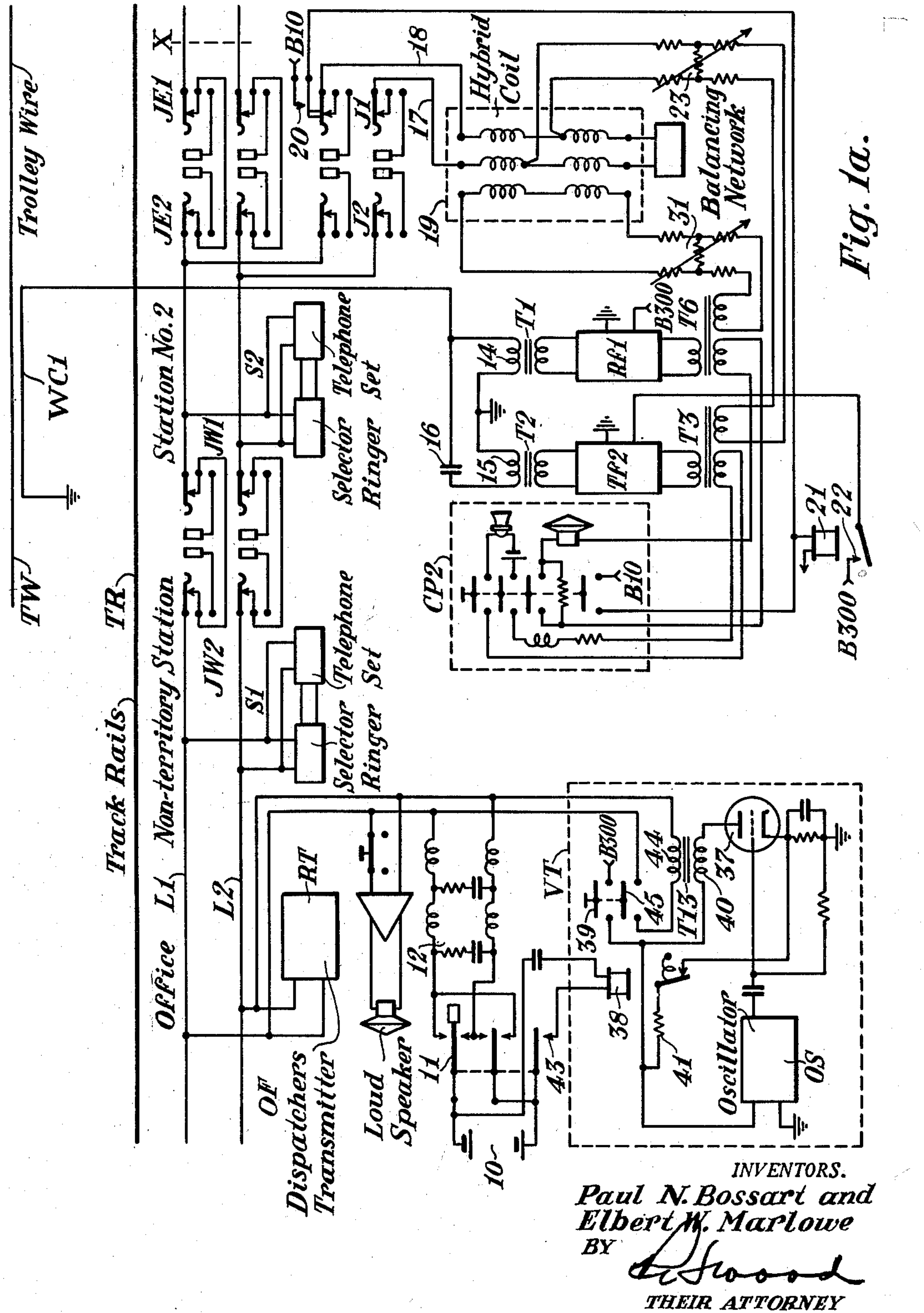

Our invention relates to means for by-passing a fault of a line circuit and for telephoning to railway trains, and more particularly to such means of the inductive carrier type.

A line circuit is generally provided along a railway for a train dispatcher to use in issuing train orders and sending messages. Such a line circuit is frequently a two-wire telephone circuit and the circuit is looped through each of several wayside stations or towers spaced at intervals along the stretch of railway under the supervision of the dispatcher, operators at the towers being given train orders by telephone for delivery to train crews as required. The dispatcher calls the different towers through a selector ringing system, each tower being assigned an individual calling code which consists of a preselected arrangement of pulses of current. The dispatcher's office is generally at a division terminal of the railway and not infrequently his office is remote from the territory under his supervision.

With a broken line wire of such a telephone circuit or if the pole line is down due to a storm, then the dispatcher is without connection to towers beyond the fault and trains may be seriously delayed for want of train orders. This condition is especially true in regions where snow and sleet storms occur.

Again, the operation of trains may be speeded up if the dispatcher can at times talk directly to the crew of a train en route, and also if each of the operators at the several towers along the railway can talk directly to train crews in the vicinity of his tower.

Accordingly, a feature of our invention is the provision of improved means for by-passing a fault of a line circuit.

A further feature of our invention is the provision of a novel and improved inductive carrier system for by-passing a fault of a line circuit.

Again, a feature of our invention is the provision of an improved inductive carrier communication system for railway trains and which system may be used for by-passing a fault of a telephone line circuit of the railway as well as for telephoning to trains en route.

A more specific feature of our invention is the provision of an improved inductive carrier train communication system for an electrified railway using a trolley wire and which system is capable of being used as an emergency link in the dispatcher's telephone line circuit.

Other features, objects and advantages of our invention will appear as the specification progresses.

The foregoing features, objects and advantages of our invention we attain by the provisions of equipment for a duplex inductive carrier telephone system. Each of several selected stations or towers along the stretch of railway involved is provided with a transmitter and a receiver of the carrier communication system and which apparatus is electrically coupled to a transmitting channel that includes a conductor paralleling the tracks. In an electrified territory of a railroad using a trolley wire, the trolley wire is preferably included in the transmitting channel because it is not easily torn down by storms or other conditions due to its relatively rugged construction.

We provide each tower with switching means wherewith the operator can connect his inductive carrier communication equipment onto the dispatcher's two-wire line circuit. This switching means is also arranged so that it can open the two-wire line circuit in either or both directions from the station. Thus, if the section of the dispatcher's two-wire line circuit between any two towers is in trouble the stations at the opposite ends of the section in trouble can connect their inductive carrier equipment to the good end of the line circuit, and disconnect the section in trouble. When this set-up is made, the voice frequency current received at a tower from the good end of the two-wire line circuit is applied to the inductive carrier equipment where it is converted to a carrier telephone current having the original voice frequencies of the voice frequency current. The carrier telephone current is supplied to the transmitting channel here assumed as including the trolley wire. At the tower at the other end of the line circuit section in trouble the carrier telephone current is picked up from the trolley wire through the inductive carrier equipment and demodulated to produce a corresponding voice frequency current which is then applied to the good end of the two-wire line circuit leading from that tower. In this way the inductive carrier system serves as an emergency link to by-pass the fault in the dispatcher's two-wire line circuit.

Any one, some or all of the trains operating through this stretch of railway are provided with inductive carrier communication equipment which is coupled to the trolley wire. Thus the dispatcher can talk directly to any train crew through the inductive carrier equipment by having the operator at the tower near the train with which he wishes to talk connect the inductive carrier equipment of that tower onto the dispatcher's line circuit.

Each tower or station is also provided with a control panel that includes a microphone and a loud-speaker, as well as control switches therefor and each operator can couple his inductive carrier equipment to the trolley wire for communication with trains near that station.

In order to preserve the selective ringing function of the dispatcher's telephone line circuit through the inductive carrier system, the dispatcher's office is provided in one form of our invention with a voice frequency transmitter and at least one of the wayside stations, which is preferably the station most remote from the dispatcher's office, is provided with a voice frequency receiver and a coding relay means. When the dispatcher wishes to use the inductive carrier system for calling he switches his voice frequency transmitter in multiple with his standard selector calling device and pulses of voice frequency energy from the voice frequency transmitter are transmitted along with the usual pulses of calling current. The usual calling current pulses are effective as far as the line circuit is intact while the voice frequency energy serves to modulate the output of the transmitter of the inductive carrier system at the tower at which the system is connected to the two wire line circuit and the call is sent out on the inductive carrier system to be picked up by the inductive carrier receiver at the station beyond the break in the two-wire line circuit. The carrier modulated by the calling voice frequency pulses is demodulated and the voice frequency pulses are then transmitted to the station at which the voice frequency receiver is provided. Here it is detected to operate the coding relay means. The operation of the coding relay means creates pulses of calling current similar to those created at the dispatcher's office by his automatic calling device. These calling pulses of current at the remote station are reapplied to the line circuit for actuating the standard selectors at stations beyond the break in the line circuit.

In another form of the invention polar relays are provided at the different stations. One relay responsive to the usual pulses of the calling current interrupts the output of the transmitter of the carrier equipment of the same station so that when the carrier equipment is connected to the dispatcher's line circuit pulses of the carrier corresponding to the pulses of the original calling current are sent out on the inductive carrier system. Other relays made operable in response to the energy passed by the receiver of the carrier equipment are provided and these relays are operated in step with the interruptions of the carrier. Thus the interrupted carrier picked up at a station beyond a break in the line circuit serves to operate these relays made operable from the receiver and these relays when code operated reapply pulses of calling current back on the line circuit for selection of the stations beyond the break of the line circuit.

We shall describe two forms of apparatus embodying our inventiton and shall then point out the novel features thereof in claims.

In the accompanying drawings, Figs. 1*a*, 1*b*, 1*c*, and 1*d* when placed together in the order named, with Fig. 1*a* at the left, are a diagrammatic view showing one form of apparatus embodying our invention when applied to an electrified territory of a railway.

Figure 2A:
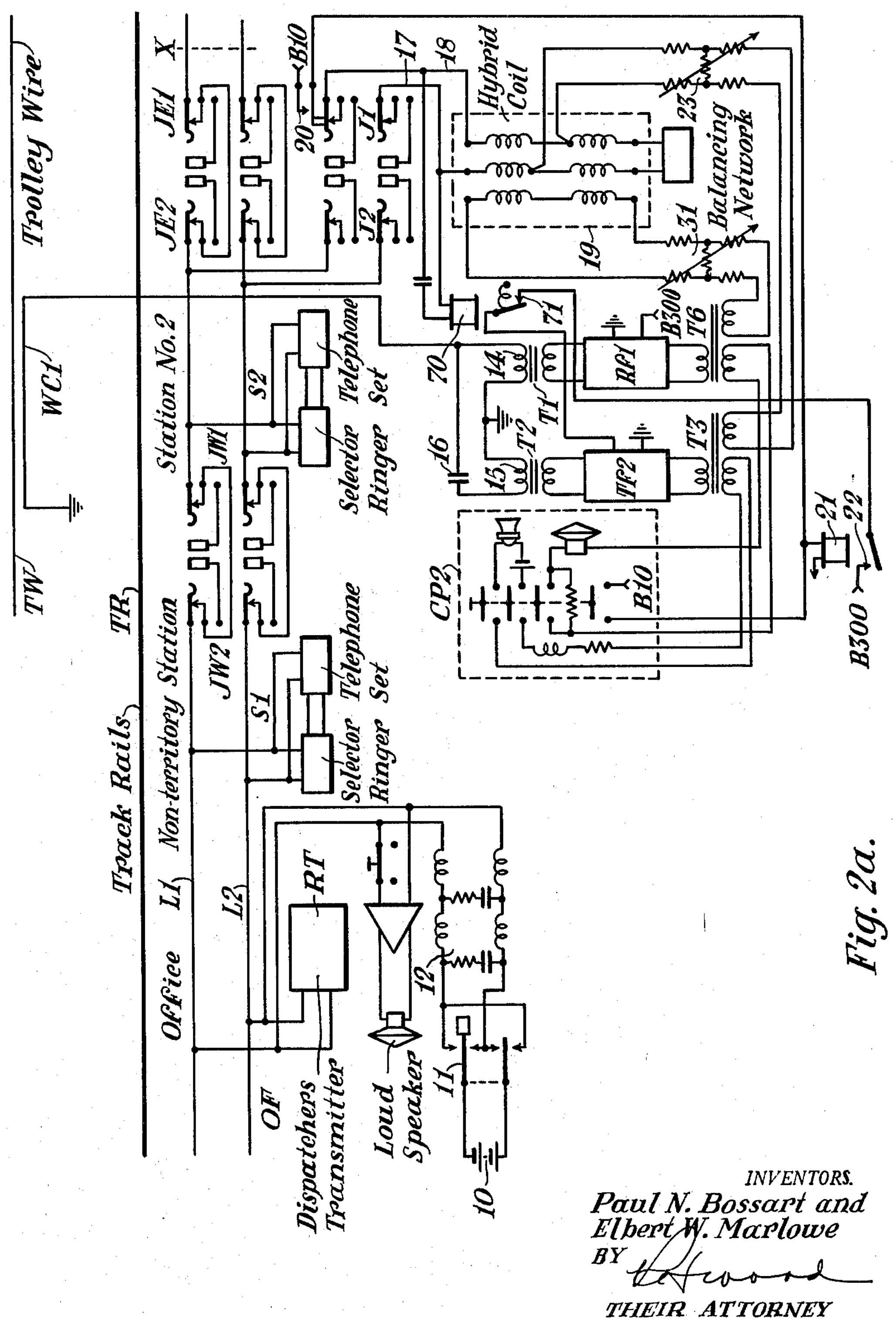
Figure 2B:
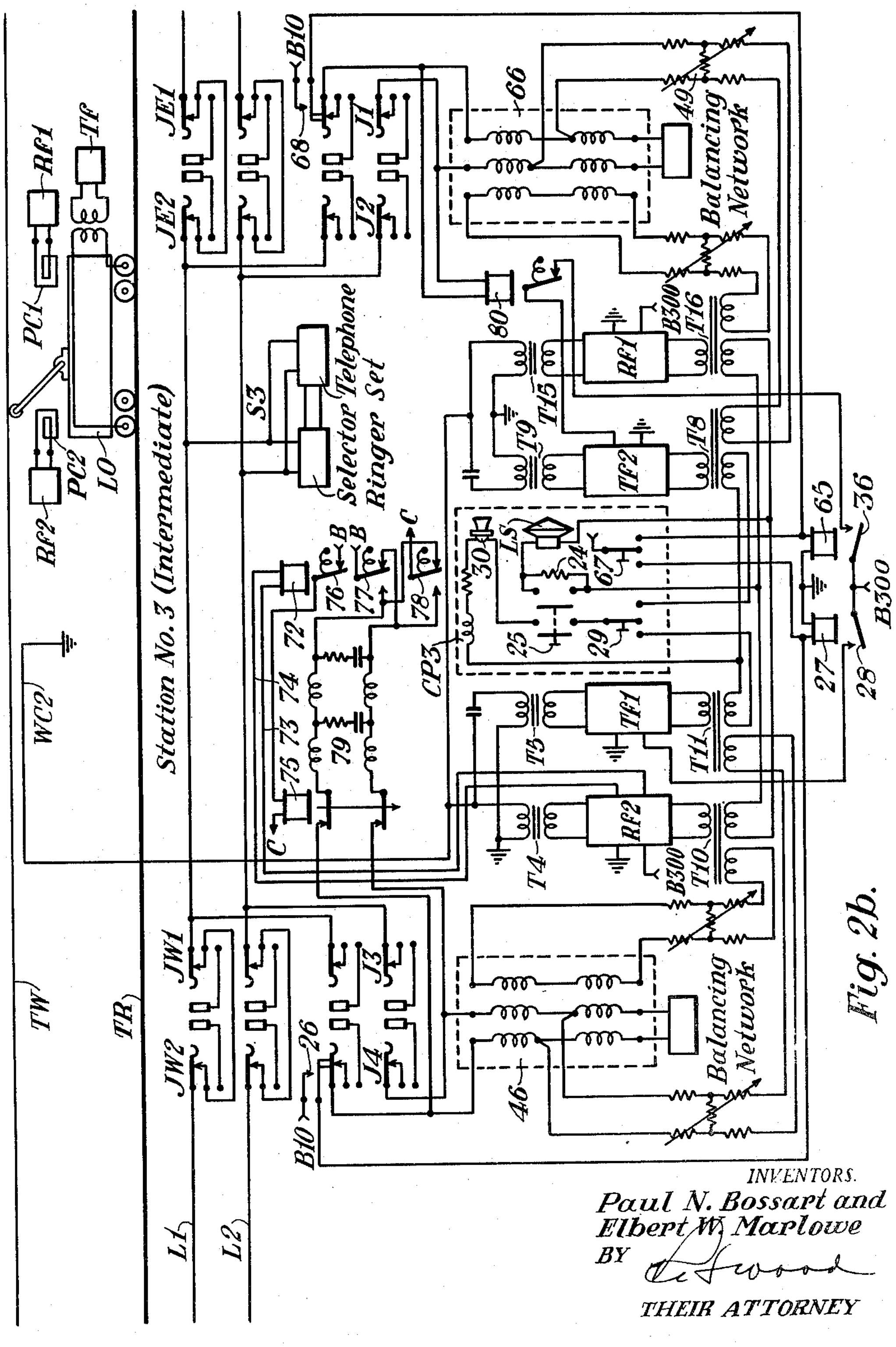
Figure 2C:
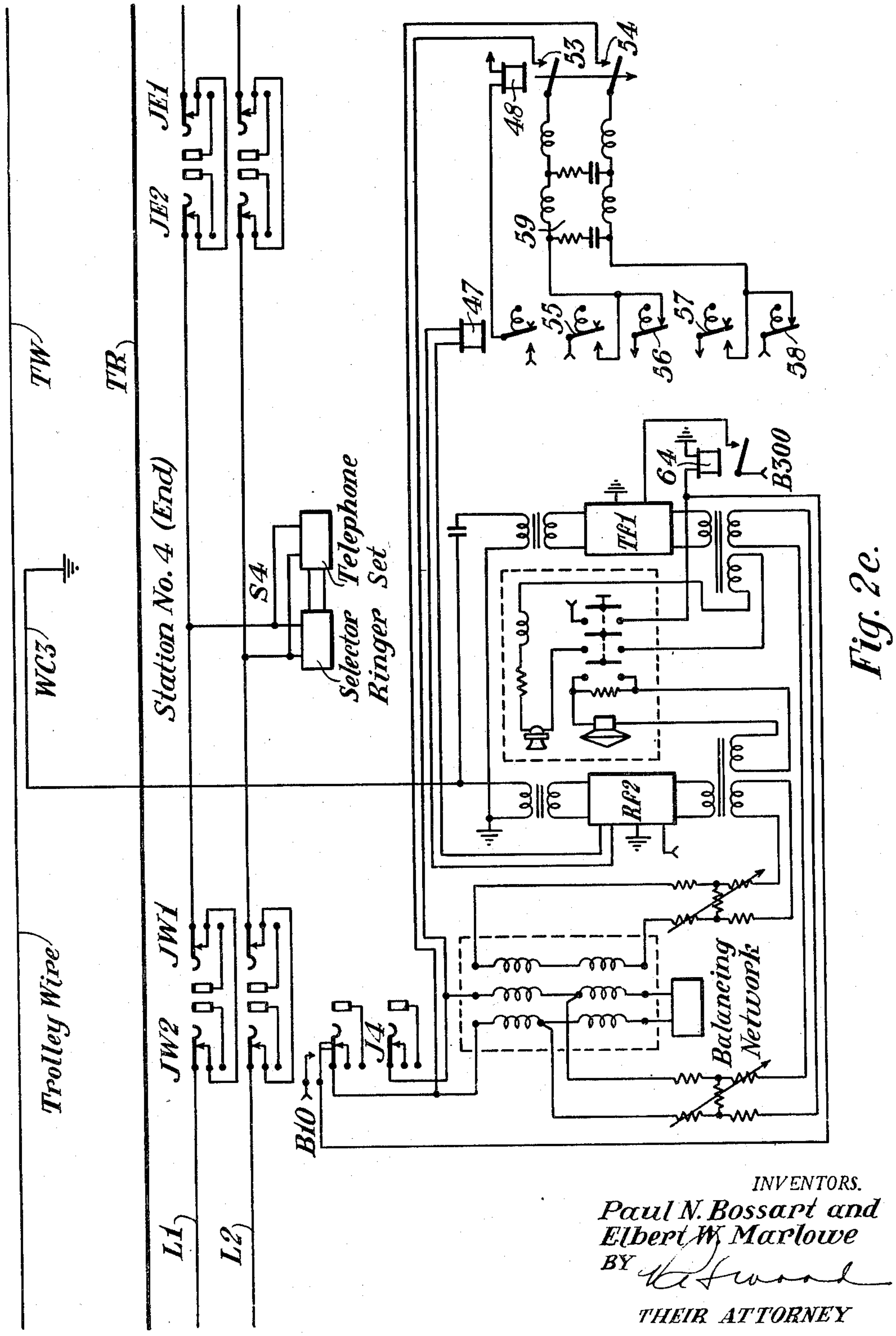

Figs. 2*a*, 2*b*, and 2*c* when placed together in the order named with Fig. 2*a* at the left, are a diagrammatic view showing another form of apparatus embodying the invention when applied to an electrified territory of a railway and when polar relays are used for selective calling of stations.

Figure 3:
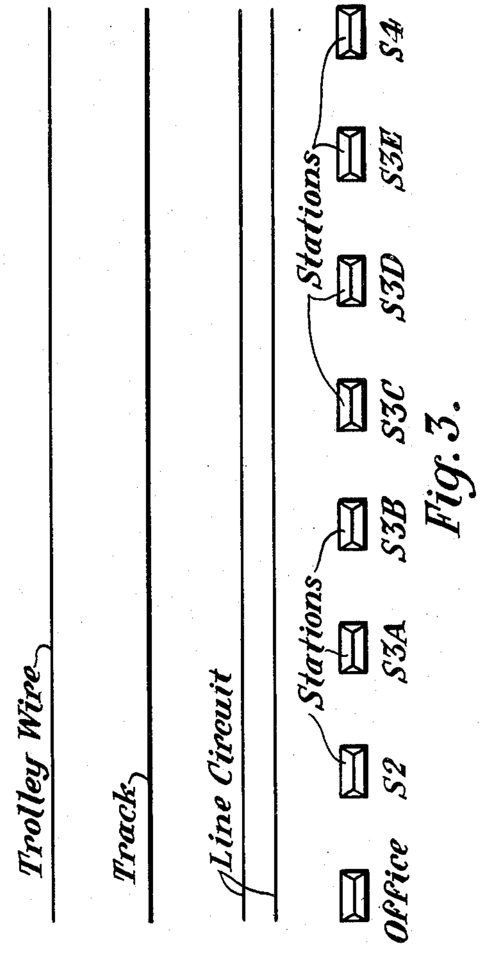
Figure 1D:
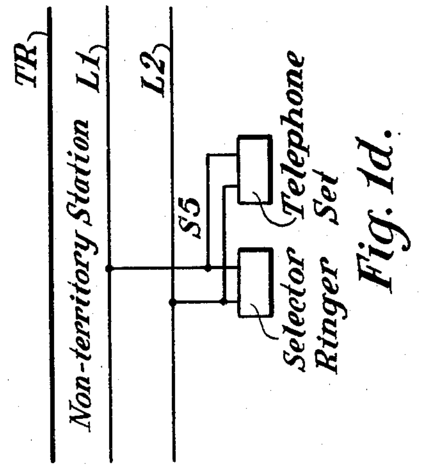

Fig. 3 is a diagrammatic view showing a railway division having a relatively large number of wayside stations or towers to illustrate the operating characteristics of the apparatus of our invention.

It is to be understood that our invention is not limited to use with an electrified territory of a railway and this one application is illustrative of its utility.

An application Serial No. 743,681, filed April 24, 1947, by Elbert W. Marlowe for Inductive Communication System for Vehicles, and of common ownership with the present application, discloses and claims means wherewith inductive carrier communication equipment at a wayside station is remotely controlled from an office and which equipment is broadly similar to the structure of the present case.

In the different views like reference characters are used to designate similar parts.

Referring to Figs. 1*a*, 1*b*, 1*c*, and 1*d*, the reference character TR designates a track of a division of a railway. This railway may be a single track line or the track TR may be one track of a multiple track road. The division may be of any given length and it will be considered as being of the order of 175 miles long. As here disclosed a given stretch intermediate the two terminals of the division is an electrified territory although the full division may be electrified. In order to aid in the understanding of the apparatus of the invention we shall assume that the electrified territory is of the order of 75 miles in length and there is a 50 mile non-electrified section each side of the electrified territory.

This electrified territory uses a trolley wire identified by the reference character TW, the limits of the electrified territory being indicated in the drawings by the limits of the trolley wire. A propulsion power system, not shown, is provided for supplying propulsion current to the trolley wire. The trolley wire TW will be suspended on cantilever arms secured to poles along the track or in any of the other standard arrangements for suspending a trolley wire above the track rails.

Traffic over this division of railway is governed by train orders issued by a dispatcher located at an office designated OF. This office may be at any suitable location and it is here shown as being located at the west or left-hand end of the division. The train orders are issued by telephone and a dispatcher's telephone line circuit including line wires L1 and L2 extends the full length of the division. This telephone circuit is of the standard form using voice frequency current and the line circuit is looped through wayside stations or towers spaced at intervals along the railway, the number and locations of such stations depending upon the passing sidings, yards, tunnels and other conditions of the railway. In the drawings, five towers or stations are shown, this number being sufficient for a full understanding of the apparatus, but it will be understood that a much larger number of stations will ordinarily be provided. Of these five stations, a first station S1 is located between the dispatcher's office and the near end of the electrified zone, the station S1 being illustrative of stations or towers along this non-electrified portion of the division. Stations S2, S3 and S4 are shown as being located at the west end, an intermediate point and the east end, respectively, of the electrified zone. That is, station S2 is the first station in the electrified zone from the office OF, station S3 is illustrative of stations spaced at intermediate points along the electrified zone and station S4 is the last and most remote station in the electrified zone from the office. The fifth station S5 is illustrative of stations spaced along the non-electrified section of the division to the east of the electrified zone.

The standard telephone equipment at the office OF and at each of the stations for the dispatcher's telephone line circuit would be of standard arrangement and it is shown conventionally for the sake of simplicity since its specific structure forms no part of our invention. Furthermore, a conventional form of selector ringing for the telephone line circuit is provided wherewith the dispatcher can call any one of the stations. It is sufficient for the present application to point out that this selector ringing means includes a battery 10, a key or automatic ringer 11, and a filter network 12 at the office OF, and a selector ringer identified by a proper legend at each of the stations. The arrangement is such that when the key or device 11 is actuated the battery 10 is connected to the line circuit through pole changing contacts of the device 11 and the circuit network 12 and current pulses of alternate polarity are supplied to the line circuit for selectively operating the station ringers according to the code of the calling current.

It is to be pointed out that in looping the telephone line circuit through each station jacks are provided for terminaling the line wires to the east of that station and also for terminaling the line wines to the west. These jacks are designated JW and JE plus numeral suffixes and those for the stations S2, S3 and S4 of the electrified zone are the only ones shown in the drawings since the jacks at these stations are the only ones involved in the present invention. Other jacks designated J plus a numeral are provided for connecting the inductive carrier equipment to the line circuit. The jacks are disclosed in the usual conventional manner and the line circuit is normally connected through each station and can be disconnected to the east or to the west of the stations by inserting plugs into the proper jacks as will be readily understood by an inspection of the drawings. Also connection of the line circuit L1—L2 to the station equipment can be made by inserting plugs into the proper jacks.

It is apparent that a break in either of the line wires L1 or L2 or if the pole line carrying these wires is down to ground the wires, the dispatcher will be without communication with the stations to the east of the fault. According to our invention we provide equipment for an inductive carrier telephone system which can be used for an emergency link to by-pass such a fault in the usual line circuit and which inductive carrier system can also be used for communication with trains en route. As here shown this inductive carrier communication system applies to only the electrified zone but it can be applied to other portions of the division.

Inductive carrier communication systems of the type here contemplated utilize line wires and other conductors paralleling the track as elements of a transmitting channel for conveying the communication energy along the railway. That is, a conductor paralleling the track rails is an element of a transmitting channel due to the distributed impedance of the conductor to ground and to the rails. In the present disclosure the trolley wire is used as a transmitting channel of an inductive carrier system, this use of the trolley wire being in addition to its normal use and without interference with the propulsion current system. It is to be observed that the suspension wires for the trolley wire and the associated power cables, not shown, may also aid in this transmitting channel. The trolley wire is particularly suitable for use as the transmitting channel for the inductive carrier system because its strength and rugged suspension make it unlikely that it will be destroyed or torn down by storms and other conditions, whereas the usual telephone wires may be wiped out by such a storm.

The inductive carrier communication equipment may take different forms and preferably it is of the type disclosed in an application for Letters Patent of the United States, Serial No. 575,311, filed January 30, 1945, now Patent No. 2,484,680, granted October 11, 1949, by Paul N. Bossart, for Railway Train Communication Systems, when the equipment of that application is modified to constitute a single channel duplex system using a first carrier frequency for transmission in one direction and a second and different carrier frequency for transmission in the other direction. By way of illustration, we shall assume that carrier frequencies of $f1$ and $f2$ for transmission to the west and to the east, respectively, are used.

The inductive carrier equipment of each wayside station is electrically coupled to the transmitting channel by being electrically coupled to the trolley wire, and similarly the equipment provided on each train is electrically coupled to the trolley wire.

Each of the stations S2 and S4 is provided with a transmitter and a receiver for the inductive carrier system, these devices being designated by the reference characters T and R, respectively, plus a suffix $f1$ or $f2$ to indicate the carrier frequency with which it is used. Thus, the first or west station S2 of the inductive carrier system is provided with one transmitter $Tf2$ and one receiver $Rf1$ because at this station transmission is to the east only and reception is from the east only. Similarly, at the last or east station S4 of the system there is provided a transmitter $Tf1$ and a receiver $Rf2$ because at this station transmission is to the west only and reception is from the west only.

Intermediate station S3 as well as all other intermediate stations that may be provided for the system, are provided with two transmitters $Tf1$ and $Tf2$ and two receivers $Rf1$ and $Rf2$ because transmission and reception at an intermediate station may be either to the east or to the west.

These transmitters and receivers are shown conventionally since they may be any one of several known forms and preferably these devices would be similar to the corresponding devices of the aforementioned Paul N. Bossart application except each transmitter is arranged for use with a single carrier frequency whereas in the Bossart application a single transmitter is adjustable for use at either of the two carrier frequencies.

The transmitters and receivers at each station are coupled to the trolley wire through an inductive coupling which includes a wayside conductor strung on the same poles that carry the trolley wire and which conductor extends for a distance to one side of the station, a distance of, say 600 feet, although other lengths of the conductor can be used.

Looking at station S2, for example, an input transformer T1 for receiver Rf1 has a primary winding 14 one terminal of which is connected to ground and the other terminal of which is connected to a wayside conductor WC1 strung relatively close to the trolley wire TW, the free end of conductor WC1 being preferably grounded. A secondary winding 15 of an output transformer T2 of transmitter Tf2 of station S2 is connected to the wayside conductor WC1 and ground in multiple with primary winding 14 of transformer T1, the connection of secondary winding 15 preferably including a capacitor 16.

The couplings of the transmitters and receivers at stations S3 and S4 will be readily apparent by an inspection of the drawings when considered with the description of the coupling at station S2.

It is to be pointed out that in place of using an inductive coupling, the transmitter and receiver of a station can be connected directly to the trolley wire through a suitable capacitor. This direct coupling would be preferable where a relatively high attenuation of the communication current occurs in the trolley wire due to excessive leakage to ground as might be the case in a tunnel.

It is to be noted that in inductive carrier telephone systems of the type here involved an effective transmission of the distance of the order of 25 to 30 miles can ordinarily be obtained. Thus in the track layout here disclosed effective transmission from station S2 to station S3 and between stations S3 and S4 is obtained although effective transmission may not be always obtained between station S2 and station S4.

Each station S2, S3, and S4 is provided with a hybrid coil and switching means as well as the aforementioned jacks for connecting the transmitter and receiver of the inductive carrier equipment onto the dispatcher's line circuit L1—L2, the arrangement being such that with the connections once set up the dispatcher can use the inductive carrier equipment at the station without further attention on the part of the operator. The switching means is mounted on a control panel that also includes a telephone set, the connections of such control panel with the corresponding station equipment will be more fully explained when the operation of the apparatus is described.

In order to preserve the selector ringing function from the dispatcher's office through the inductive carrier equipment, a voice frequency transmitter indicated as a whole by the reference character VT is provided at the office OF and a corresponding and cooperating voice frequency receiver and coding relay means indicated as a whole by a dotted rectangle VR are provided at station S4. These devices VT at the office and VR at the station S4 will also be more fully explained when the operation of the apparatus is described.

A vehicle of a train, such as a locomotive, is indicated conventionally at LO, the train of which this locomotive is a part being en route in the vicinity of the wayside station S3. The locomotive LO is provided with inductive carrier equipment comprising two receivers Rf1 and Rf2 and a single transmitter designated Tf. These devices on the locomotive are capable of using the carrier frequencies here assumed and are preferably of the form disclosed in the beforementioned Paul N. Bossart application. The train carried receivers Rf1 and Rf2 are connected to pick-up coils PC1 and PC2, respectively, each of which coils is mounted on the the locomotive for inductive relation with the trolley wire. The output of the transmitter Tf on the locomotive is connected to a sending loop circuit that is connected to two pairs of spaced wheels of the locomotive and which loop circuit is arranged for inductive association with the transmitting channel including the trolley wire in the well-known manner for such carrier systems. It is clear that the train carried sending and pick-up elements may be arranged for capacitance coupling with the trolley wire in place of inductive coupling or the transmitters and receivers of the locomotive may be both inductively and capacitively connected to the trolley wire through independent coupling units. Other locomotives and other train vehicles of trains operating in the electrified territory may be provided with inductive carrier telephone equipment similar to that provided for the locomotive LO.

In describing the operation of the apparatus of Figs. 1*a*, 1*b*, 1*c*, and 1*d*, we shall first consider the normal condition, that is, the condition when the telephone line circuit L1—L2 is intact throughout the division. Under this normal condition, the dispatcher issues train orders and other messages to the different stations through his standard telephone equipment, calling the stations as wanted through the regular selector ringing devices.

The inductive carrier system equipment is in a stand-by condition during such normal operation of the dispatcher's line circuit. In the stand-by condition of the carrier equipment the receivers R at each of the stations and on each of the trains are energized and ready for reception but the transmitters are deenergized and inactive. At each station and on each train a suitable source of power for energizing the receivers and transmitters is provided, such source of power being here indicated by a positive terminal B300 and a negative terminal which is connected to ground in the usual manner.

We shall next assume that there is a break in one or both the line wires L1 and L2 between stations S2 and S3 at a location indicated in Fig. 1*a* by a dotted line X. The dispatcher will discover that he is unable to communicate with stations east of the station S2 by his regular telephone equipment. This being so and the dispatcher wishing to issue an order to the operator at station S3, for example, the dispatcher will first call up the operator at station S2 by his regular telephone equipment and inform that operator of the fact that the line circuit is out to the east of his station and the inductive carrier equipment will be used to by-pass the fault. The operator at station S2 inserts plug in jack JE1 to disconnect the line wires L1 and L2 to the east and into jacks J1 and J2 to connect the line wires from the west to wires 17 and 18 leading to a hybrid coil and balancing network 19. A contact 20 of the jack J1 is also closed to complete a connection from positive terminal B10 of a low voltage control source provided at each station to a control relay 21 and relay 21 is energized and picked up closing front contact 22. The closing of front contact 22 of relay 21 completes a connection for applying power from terminal B300 to the transmitter $Tf2$ at station S2 and that transmitter is energized and made active along with the already active receiver $Rf1$.

With this set-up at station S2 the dispatcher proceeds to call station S3 and to do so he would ordinarily send over his regular telephone set an agreed salutation. Considering that the dispatcher speaks a given salutation for identifying the station S3 into his telephone transmitter, the corresponding voice telephone current is transmitted to station S2 over the good portion of the line circuit L1—L2 and at station S2 this voice current is applied through wires 17 and 18, hybrid coil 19, resistance pad 23 and input transformer T3 to the now active transmitter $Tf2$. The carrier frequency $f2$ of this transmitter is modulated by the voice current and a corresponding carrier telephone current is supplied to the wayside conductor WC1 through the output transformer T2 of the transmitter $Tf2$. This current flowing in the wayside conductor WC1 induces a corresponding electromotive force in the trolley wire TW and current flows therein to induce an electromotive force in the wayside conductor WC2 at station S3, it being recalled that stations S2 and S3 are within effective range of transmission for the inductive carrier system. From conductor WC2 the carrier telephone energy is applied to receiver $Rf2$ at station S3 through an input transformer T4. Since the receiver $Rf2$ is normally energized and responsive to carrier telephone current of the carrier $f2$ frequency, this current is demodulated and the voice frequency current is applied to a loud-speaker LS of the control panel CP3 of station S3, the loud speaker being connected to the output of the receiver $Rf2$ through transformer T10 at a reduced sensitivity due to a resistor 24 being connected in series with the loud-speaker.

The attention of the operator at station S3 having been attracted by this call from the dispatcher, the operator would ordinarily close switch 25 of his control panel and switch the loud-speaker to its full sensitivity, the closing of switch 25 also preparing a microphone circuit to be referred to shortly. The dispatcher would follow up such a call by informing the operator at station S3 that there is a break in the line wires L1 and L2 to the west of his station and the inductive carrier equipment is to be used for communication. In view of this information the operator at station S3 would plug into jack JW1 to disconnect the faulty line wires L1 and L2 to the west. He would also plug into jacks J3 and J4 to connect his carrier equipment onto the line circuit to the east. When the plug is inserted into the jack J4 at station S3 a contact 26 is closed to complete a circuit for energizing control relay 27 which relay picks up closing front contact 28 and applying power to the transmitter $Tf1$ at that station, so that both the receiver $Rf2$ and transmitter $Tf1$ at station S3 are now energized for communication with the dispatcher.

Voice frequency telephone current of a dispatcher's message is supplied at the office OF to the line wires L1 and L2 and received at the station S2 to be applied to transmitter $Tf2$ and supplied to the transmitting channel of the inductive carrier system for transmission to station S3 beyond the break in the line circuit. At station S3 this carrier telephone current is inductively received from the trolley wire and applied to the receiver $Rf2$ through input transformer T4 and demodulated and the message sounded in the loud-speaker LS. In replying to the dispatcher, the operator at station S3 would close his switch 29 of the control panel to the left as viewed in Fig. 1b to complete the microphone circuit which is now connected to the input of transformer $Tf1$ through input transformer T11. The carrier $f1$ of this transmitter is modulated by the voice frequencies created in the microphone 30 and the resulting carrier telephone current is supplied through output transformer T5 to the wayside conductor WC2 and inductively transferred to the trolley wire. This current is inductively picked up from the trolley wire by conductor WC1 at station S2 and applied to the input of receiver $Rf1$ of that station through input transformer T1. After demodulation the voice frequency current is applied through transformer T6, resistance pad 31, hybrid coil 19 and wires 17 and 18 to the line wires L1 and L2 for transmission to the office OF where the voice frequency current is received by the usual dispatcher's receiving set.

It follows from the foregoing that the dispatcher and operator at station S3 can carry on a two-way conversation around the broken line wires by using the inductive carrier equipment at stations S2 and S3, the connection at each station once made by the operator requiring no further attention on his part.

It is to be noted that in place of the dispatcher calling station S3 through the inductive carrier system, he can have the operator at station S2 call the operator at station S3 through the inductive carrier system.

Assuming that with the line circuit interrupted at location X between stations S2 and S3 the dispatcher wishes to communicate with station S4, which station S4 will ordinarily be beyond the effective range of transmission of the carrier system from station S2. In this case the dispatcher would first call the station S2 and have the operator cut in the inductive carrier equipment in the manner previously explained. The dispatcher would then call station S3 or have the operator at station S2 call the operator at station S3 through the inductive carrier equipment in the manner explained hereinbefore and have the operator at station S3 disconnect the faulty line section and connect the carrier equipment to the line circuit to the east in the manner previously explained. It is to be noted that the output of receiver $Rf2$ and the input of transmitter $Tf1$ at station S3 are now connected to the line circuit leading to the east of station S3 through a hybrid coil 46 and jacks J3 and J4, the connection of receiver $Rf2$ including output transformer T10 and the connection of transmitter $Tf1$ including input transformer T11.

With the inductive carrier equipment thus cut in at stations S2 and S3, the dispatcher calls the operator at station S4 around the break in the line circuit by use of his voice frequency transmitter VT. The transmitter VT comprises an oscillator OS, a power amplifier tube 37, a biased polar relay 38, a transformer T13 and a disconnect switch 39. The oscillator OS is shown conventionally and is preferably of the electron tube type adaptable of supplying a given voice frequency current, a voice frequency of the order of say 1000 cycles per second. The output of the oscillator OS is capacitance coupled to the control grid of amplifier tube 37. With switch 39 closed, terminal B300 of a suitable office power source is connected to the oscillator OS and to the anode of the tube 37, the connection to the anode of tube 37 including primary winding 40 of transformer T13, a secondary winding 44 of which transformer is connected across the line wire through a contact 45 of the switch 39. Normally, the tube 37 is biased to cutoff through a connection that includes resistor 41 and a normally closed polar contact 42 of relay 38, this connection serving to bias the cathode of the tube positive in potential with respect to the control grid from the source B300. When relay 38 is reversed the bias is removed and tube 37 is active to amplify the voice frequency output of the oscillator.

To call the station S4, the dispatcher would close switch 39 of the device VT and then operate calling device 11 as required for the device 11 to send out a code for station S4. A contact 43 of the device 11 is closed each operating cycle of the device to complete a simple circuit for impulse energizing relay 38 at reverse polarity and opening contact 42 so that a pulse of the voice frequency current of oscillator OS is amplified and applied across the line wires L1 and L2. This code pulse of 1000 cycle current is transmitted to the station S2 and applied to the input of transmitter Tf2 through hybrid coil 19 to modulate the carrier and a pulse of carrier current f2 modulated by the 1000 cycle current is sent out over the inductive carrier system to be picked up at station S3 and demodulated at receiver Rf2 at that station. The 1000 cycle pulse of current at station S3 is supplied to the line circuit from receiver Rf2 through transformer T10 and hybrid coil 46 and is transmitted over the line circuit to station S4. At station S4 this pulse of 1000 cycle current is applied through wires 50 and 51 to the voice frequency receiver VR which includes a tuned input transformer T14, a detector DT and a relay coding means consisting of a biased polar relay 47 and a slow release relay 48. The detector DT is of a conventional form and is capable of operating the relay 47 in step with the code pulses received from the line circuit. Each time relay 47 is reversed to close contact 52, the relay 48 is supplied with an energizing pulse, the relay 48 being picked up on the first operation of relay 47 and then retained picked up as long as the relay 47 is operated by the code pulses due to the slow release of the relay 48. With relay 48 picked up to close front contacts 53 and 54 and relay 47 operated to open and close its normal and reverse polar contacts 55, 56, 57, and 58, pulses of the usual normal form of calling current are supplied to the line circuit through a filter network 59 and such pulses will be applied to the selector ringer at the station S4 to call station S4 in the usual manner.

Subsequent to being thus called the operator at station S4 uses the regular telephone set in the usual manner for receiving a message from the dispatcher and for replying thereto. In this connection it is to be noted that speech from the dispatcher's office will be transmitted to station S2 over the usual line circuit, and sent out by the transmitter Tf2 of that station as a carrier telephone current. This current will be picked up from the trolley wire at station S3 and demodulated at its receiver Rf2 and the voice frequency current supplied to the line wires extending to the east of station S3 for transmission to station S4 at which point the voice frequency telephone current will be received by the regular telephone set. A reply from the operator at station S4 is transmitted as a voice frequency current over the line circuit to station S3 where the voice current is applied to transmitter Tf1 through hybrid coil 46 and input transformer T11 to modulate the carrier f1. The modulated carrier telephone current is then applied to the trolley wire and received at the station S2 and demodulated at receiver Rf1 and after demodulation the voice frequency current is reapplied to the line circuit to the west of the station S2 and transmitted to the dispatcher's office for reception on his usual receiver set.

Assuming that the line wires are ruptured at the location X and the dispatcher desired to communicate with some station to the east of the electrified zone, such as station S5 for example. The procedure for the dispatcher to call station S5 is similar to that for his calling station S4 except that at station S4 the regular calling code pulses reapplied to the line circuit from the coding means of device VR will be transmitted to station S5 where they are selectively received by the selector ringer of that station. Subsequent to such a call two-way conversation between the dispatcher and the operator at station S5 can be effected through the inductive carrier equipment around the break in the line circuit in the same manner as described in connection with communication between the dispatcher and the station S4.

Operation of the apparatus to by-pass a fault at some other section of the line circuit by use of the inductive carrier equipment will be readily understood by an inspection of the drawings when taken in connection with the operation of the apparatus to by-pass the break in the line circuit at location X.

We will next consider the operation of the apparatus for the dispatcher to talk to the crew of the locomotive LO while the locomotive is operating in the vicinity of but to the east of station S3. The dispatcher would call station S3 over his standard selector ringer and have the operator switch in the inductive carrier equipment, such switching being done by inserting plugs into jacks J1 and J2 of station S3 and connecting the line wires L1 and L2 to the west to the transmitter Tf2 and the receiver Rf1 of station S3. When the plug is inserted in jack J1 the closing of contact 68 causes control relay 65 to be energized and picked up closing front contact 36 to apply power to the transmitter Tf2. Voice frequency current from the office is now applied to the input of transmitter Tf2 of station S3 through hybrid coil 66, resistance pad 49 and input transformer T8 and the resulting carrier telephone current is applied through output transformer T9 to the wayside conductor WC2 for transmission through the trolley wire to the locomotive LO. At the locomotive the energy is picked up by coil PC2 and applied to the locomotive receiver Rf2 and demodulated and reproduced in the associated loud-speaker, not shown. To reply, the locomotive crew will switch the transmitter Tf on the locomotive for use on the carrier frequency f1 since transmission is to the west and also the carrier f2 is being used for reception. Carrier telephone current sent out from the locomotive is sent out from the locomotive through the trolley wire to be picked up by conductor WC2 of station S3 and applied to the input of receiver Rf1 of this station through input transformer T15. After demodulation the voice frequency current is applied to the line wires L1 and L2 through output transformer T16 and hybrid coils 66 for transmission to the office OF. In this way a two-way conversation can be carried on between the dispatcher at the office and the crew on the locomotive.

The locomotive crew can initiate communication with the dispatcher by first sending a call over the inductive carrier equipment for reception at the station S3, the crew using the carrier frequency $f1$. This call is demodulated at receiver $Rf1$ and sounded on the loud-speaker LS of station S3. After such a call is received the crew would inform the operator at station S3 to connect the inductive carrier equipment to the dispatcher's line circuit and which the operator would do by inserting plugs into the jacks J1 and J2. In doing this the operator would first check by using his standard telephone set that the dispatcher is not using the line circuit for issuing orders to some other station. With the set-up made at station S3 two-way conversation can be effected between the locomotive crew and the dispatcher at the office in the manner explained hereinbefore.

Communication between the dispatcher and trains in the vicinity of stations S2 and S4 can be accomplished in a manner similar to that explained in connection with communication with the locomotive LO in the vicinity of station S3. It is to be noted that at station S4 the transmitter $Tf1$ is governed by a control relay 64 which in turn is controlled by a contact of jack J4.

In the event the operator at station S3 wishes to communicate with locomotive LO which is operating within the transmission range of that station, the operator would close switch 25 and shift selector switch 29 and switch 67 at his control panel CP3 to the right. This switching would pick up relay 65 to energize the transmitter $Tf2$ and effectively connect the microphone 30 and loud-speaker LS to the transmitter $Tf2$ and receiver $Rf1$, respectively. With this set-up the operator could call the train by speaking an agreed call into the microphone, the voice frequencies being applied to the input of transmitter $Tf2$ and the modulated carrier $f2$ being applied to the trolley wire through conductor WC2 for transmission to the locomotive where it is picked up by coil PC2 and applied to the train receiver $Rf2$. In replying the locomotive crew would use the carrier $f1$ and the carrier telephone current would be received and demodulated at receiver $Rf1$ of station S3 and the speech sounded at the loud-speaker. Thus the operator at station S3 can carry on a conversation with the nearby train without disturbing the dispatcher's line circuit. The operators at stations S2 and S4 can communicate with trains operating within the vicinity of these stations in a similar manner as explained for station S3.

It is to be noted that a choke coil can be installed on each locomotive in the usual power lead from the trolley to the locomotive control equipment to prevent loss of the communication current through the locomotive motors to ground if such loss is found to impair effective operation of the communication system.

Referring now to Figs. 2*a*, 2*b*, and 2*c*, the track layout and the locations of the dispatcher's office and the wayside stations are the same as considered for Figs. 1*a*, 1*b*, 1*c*, and 1*d*. Also the dispatcher's line circuit and the carrier inductive equipment are the same as previously described except that the voice transmitter VT and voice receiver VR are omitted and polar relays and filters are provided for the carrier equipment to effect the station calling through the inductive carrier system. The operation of the apparatus is substantially the same as in Figs. 1*a*, 1*b*, 1*c*, and 1*d* except for the station calling and it is believed that this calling means can best be understood from a description of this part of the operation of the apparatus. Under normal conditions of the line circuit the carrier equipment of Figs. 2*a*, 2*b*, and 2*c* is in its stand-by condition, the receivers being energized and the transmitters being deenergized.

Assume that the line circuit is open at location X east of station S2 and the dispatcher wishes to call station S3 to the east of the line circuit fault. The dispatcher first calls station S2 to tell the operator at that station to cut in his carrier equipment, which he does by inserting plugs into jacks JE1, J1, and J2 to disconnect the line to the east, connect the transmitter $Tf2$ and receiver $Rf1$ to the line circuit to the west and to energize transmitter $Tf2$.

The dispatcher can thus call station S3 direct by speaking an agreed salutation into his transmitter. The voice telephone current is received at station S2 and applied to transmitter $Tf2$ to modulate the carrier $f2$. This carrier telephone current is transmitted over the trolley wire and received at receiver $Rf2$ of station S3. At receiver $Rf2$ the current is demodulated and the salutation is sounded at the loud-speaker at station S3. With the operator at station S3 alerted the dispatcher can instruct the operator as to the line circuit fault and to connect in his inductive carrier equipment which the operator will do by inserting plugs into jacks JW2, J4, and J3.

In place of the dispatcher issuing these orders directly to the operator at station S3, the dispatcher can have the operator at station S2 call the operator at station S3 over the inductive carrier system which the operator at station S2 can do because the receiver $Rf2$ at station S3 is normally active. The operator at station S2 would then direct the operator at station S3 to cut in his inductive carrier equipment to the line circuit to by-pass the fault at location X.

With the inductive carrier system linked around the line circuit fault the dispatcher can call any station east of the fault. Assume for example the dispatcher wishes to call station S4 through the inductive carrier system bridging around the line circuit fault at location X. The dispatcher will operate his calling device 11 as required to send out the code pulses for station S4. These pulses are received at station S2 and operate a biased polar relay 70 connected across the line through jacks J1 and J2 in multiple with the input to the hybrid coil 19, so that relay 70 receives an impulse to reverse the relay each code pulse. When relay 70 is reversed opening its normal contact 71, the transmitter $Tf2$ is made inactive. As here shown it is made inactive by the opening of the connection through which it is powered but other arrangements can be used. This interruption of transmitter $Tf2$ causes the carrier $f2$ supplied to conductor WC1 and thence to the trolley wire to be coded according to the code pulses sent out from the dispatcher's office. These pulses of the carrier are received at station S3, and applied to receiver $Rf2$. The receiver $Rf2$ of station S3 is provided with a connection which is connected to a terminal at which a voltage is produced in receipt of the carrier $f2$ and which voltage disappears when the carrier is interrupted. One place such voltage is provided in the receiver may be in the squelch or noise suppression circuit usually provided for receivers of the type here contemplated. Thus voltage pulses thus created in receiver $Rf2$ are applied to a biased polar relay 72 over wires 73 and 74, the connection being such that the relay 72 is reversed for each such voltage pulse. A neutral relay 75 is normally energized through a normal polar contact 76 of relay 72 and thus relay 75 is deenergized as long as the carrier is received but when relay 72 is code operated in response to code interruption of the carrier the relay 75 receives an energizing pulse each off code period of the carrier. Relay 75 is provided with a slow release period sufficient to retain the relay picked up as long as relay 72 is code operated. With relay 75 picked up and relay 72 code operated to operate its pole changing contact members 77 and 78, direct current pulses of alternate polarity are supplied through a filter network 79 to the line circuit to the east of station S3, the connections to line wires L1 and L2 being completed through jacks J4, J3, JE2, and JE1.

It follows that the calling codes sent out from the dispatcher's office for station S4 are impressed upon the carrier *f*2 at station S2 and sent out on the inductive carrier system. The code pulses of the carrier are received at station S3 by the receiver R*f*2 for operation of relays 72 and 75 and calling code pulses corresponding to the original code sent out by the dispatcher are reapplied to the line circuit at station S3 for selective operation of the selector ringer at station S4. Similarly, the dispatcher can call any other station to the east of the line circuit fault.

The station S3 is provided with a polar relay 80 which corresponds to polar relay 70 of station S2, and station S4 is provided with relays 47 and 48 and a filter 59 which corresponds to relays 72 and 75 and filter 79 at station S3 for by-passing a call around a break in the line wires L1 and L2, between the stations S3 and S4, the operation being similar to that explained in by-passing a station call around a line circuit break at location X.

A system such as here disclosed is capable of by-passing more than one break in the line circuit. Referring to Fig. 3, which discloses a division having a relatively large number of wayside stations each of which stations is connected to the office through a dispatcher's telephone line circuit. Also inductive carrier equipment is assumed as being provided at each of the stations and coupled to the trolley wire or some other conductor. If these stations of Fig. 3 are spaced apart so that effective transmission for the inductive carrier system is obtained between adjacent stations only, then the equipment could by-pass a break in the line wires between any two adjacent stations the same as explained in connection with Figs. 1*a*, 1*b*, and 1*c*. Also it would be possible to by-pass more than one break between stations if the two breaks are not between successive stations. For example, the system would by-pass breaks in the line circuit between stations S2 and S3A of Fig. 3, between stations S3B and S3C, and between stations S3D and S3E.

In the event the stations of Fig. 3 are spaced so that the effective range for the inductive carrier system is equal to two sections each side of the station, then two breaks in the line circuit for two successive sections of the line circuit can be by-passed by the inductive carrier system.

Figure 1B:
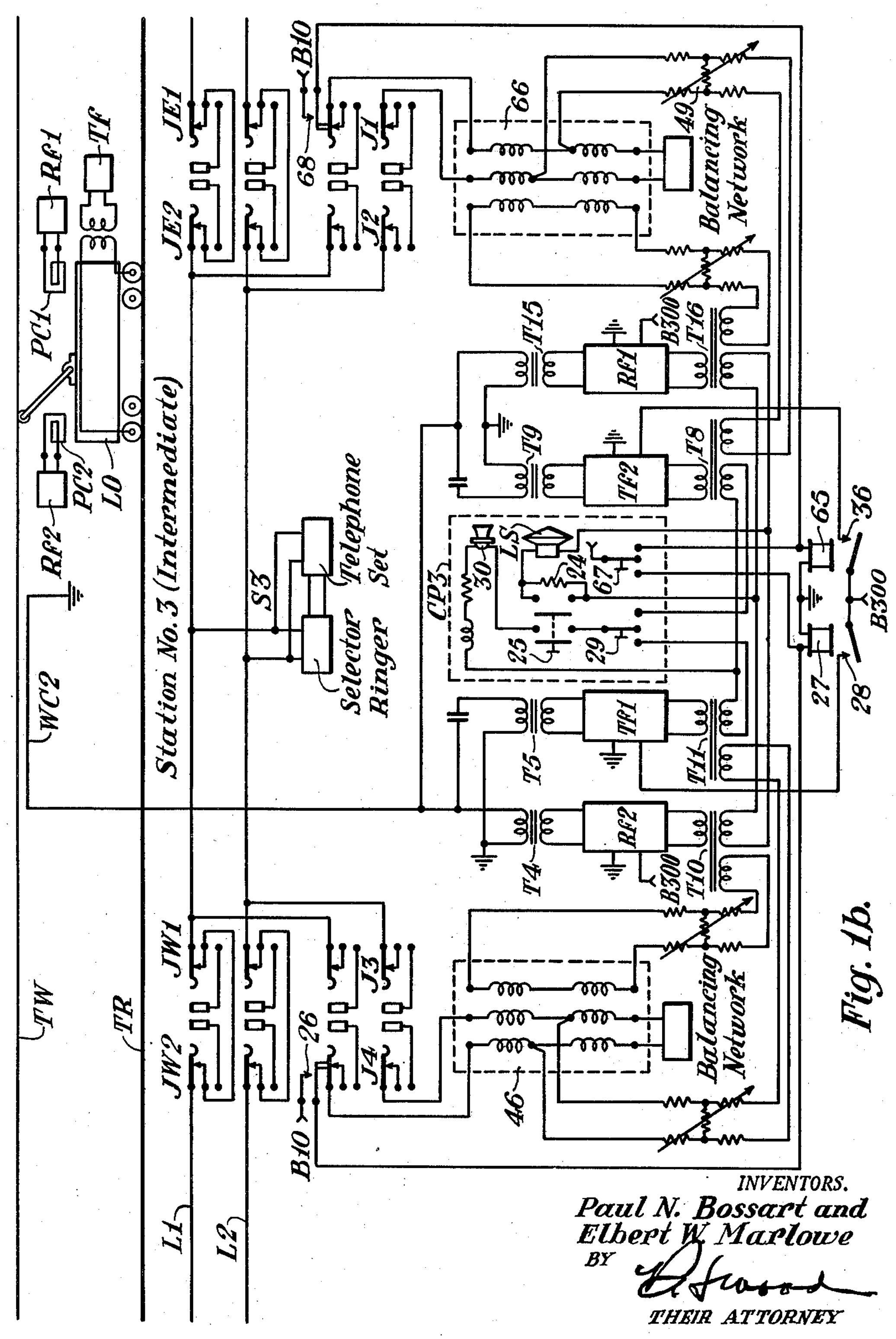
Figure 1C:
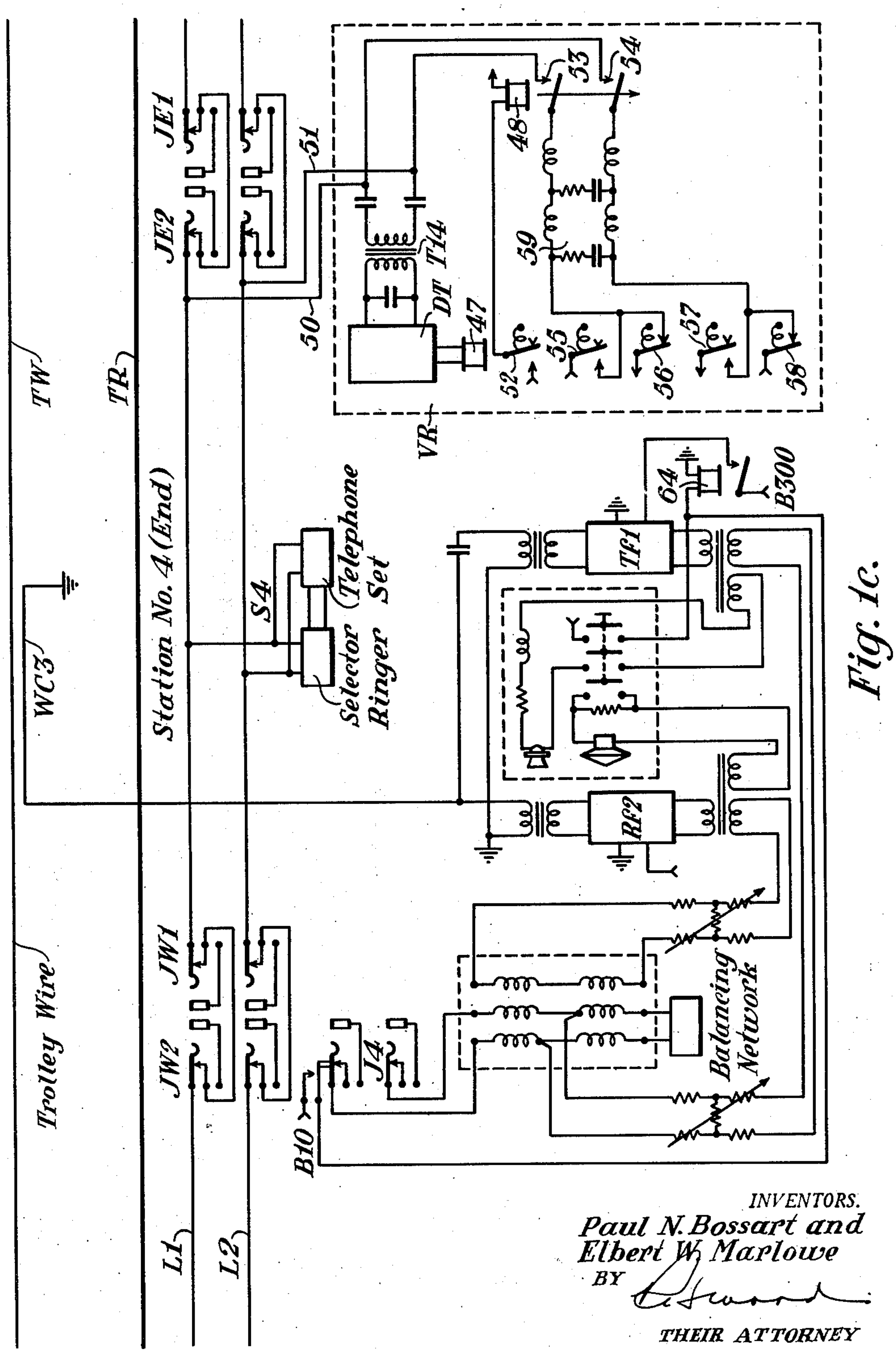

In the extreme circumstances that the line circuit of Figs. 1*a*, 1*b*, and 1*c* is interrupted between two adjacent sections, such as between stations S2 and S3 and between stations S3 and S4, the two breaks can be by-passed by the inductive carrier system by transmitting the message from the dispatcher to the operator at station S3 and having the operator at station S3 repeat the message over the inductive carrier system to station S4.

Although we have herein shown and described only two forms of means for by-passing a fault of a line circuit and for telephoning to railway trains embodying our invention, it is understood that various changes and modifications may be made therein within the scope of the appended claims without departing from the spirit and scope of our invention.

Having thus described our invention, what we claim is:

1. In combination, an office, several stations spaced apart to one side of the office, a two-wire line circuit extending from the office through said stations, station calling apparatus including coding means at the office and a selector at each of said stations, said office coding means including a coding device and a current source, said coding means being connected to said line circuit and operable to supply pulses of current of different codes, each said selector connected to said line circuit and including means responsive to pulses of current of a code individual for the respective station, carrier current equipments one at each of said stations, each said equipment including a transmitter having means for supplying carrier frequency current and a receiver having means responsive to carrier frequency current, a transmitting medium for carrier frequency current and which medium is common to said stations and exclusive to said two-wire line circuit, each said carrier current equipment having an output circuit of its transmitter and an input circuit of its receiver electrically coupled to said transmitting medium, additional station calling apparatus including a first and a second code repeating means at each of selected ones of said stations, each said first code repeating means including means having connections to the transmitter of the same station and to said two-wire line circuit through a manually operable controller, each said first code repeating means being effective to code the carrier current supplied by the respective transmitter to said transmitting medium in step with code pulses of current received from said line circuit, each said second code repeating means including means connected to the receiver at the same station and having connections to said line circuit through a manually operable controller, and each said second code repeating means being effective to supply to the line circuit code pulses of current in step with code pulses of carrier frequency current received from said transmitting medium.

2. In combination, an office, several stations spaced apart to one side of the office, a two-wire line circuit extending from the office through said stations, a station calling means at said office and including a source of direct current and a coding device, said calling means being connected to said line circuit and operable for supplying pulses of direct current of different codes, a selector at each of the stations, each said selector connected to said line circuit and including means responsive to pulses of direct current of a code individual for the respective station, carrier telephone equipments one at each of said stations and each equipment including a transmitter and a receiver, each said transmitter having an input and an output circuit and including means for supplying a carrier telephone current to its output circuit in response to a voice frequency current supplied to its input circuit, each said receiver having an input and an output circuit and including means for supplying a voice frequency current to its output circuit in response to a carrier telephone current supplied to its input circuit, a transmitting medium of carrier telephone current common to all of said stations and exclusive of said two-wire line circuit, each said carrier telephone equipment having the output circuit of its transmitter and the input circuit of its receiver electrically coupled to said transmitting medium, circuit means at each of said stations and including circuit controller contacts which are operable to a given position to connect the input circuit of the transmitter and the output circuit of the receiver of the same station to said line circuit, an oscillator at said office and including means to supply a given voice frequency current, means at the office to connect said oscillator to said coding device and to said line circuit for supplying code pulses of voice frequency current of said given frequency to the line circuit, a detector and a coding relay means at the station most remote from said office, said detector connected to said line circuit and including means responsive to current of said given voice frequency, said coding relay means being connected to said detector and including a code following relay, a source of direct current at said most remote station, and circuit means at said most remote station and including contacts of said relay to connect said last mentioned source of direct current to said line circuit.

3. In a station calling means for a communication system which provides communication between an office and several stations which are spaced apart to one side of the office and which system uses a two-wire line circuit extending between the office and the several stations, the combination comprising, a battery and a coding device at the office, said battery being connected to said line circuit through said coding device, said coding device being operable to code the current supplied by the battery according to different codes, a selector at each of said stations, each selector being connected to said line circuit and including means responsive to code pulses of direct current of a code individual for the respective station, carrier telephone equipments one at each of said stations, each said equipment including transmitting apparatus having means operable to supply a carrier telephone current in response to a voice frequency current supplied to the equipment, each said equipment also including receiving apparatus having means operable to supply a voice frequency current in response to carrier telephone current supplied to the equipment, a transmitting medium of carrier telephone current, said transmitting medium being common to all of said stations and independent of said two-wire line circuit, each said carrier telephone equipment being electrically coupled to said transmitting medium, circuit means at each of said stations and including circuit controller contacts which are operable to a given position for connecting the carrier telephone equipment of the same station to said line circuit, an oscillator at said office and including means operable to supply current of a given voice frequency, means at the office including a contact of said coding device to connect said oscillator to said line circuit to supply code pulses of current of said given voice frequency to the line circuit, said carrier telephone equipments of any two adjacent stations being effective to transmit said code pulse of voice frequency current between the stations through said transmitting medium independent of the line circuit between the two adjacent stations when the two carrier telephone equipments are coupled to both the transmitting medium and the line circuit, a detector and a coding means at the station most remote from said office, said detector connected to the line circuit and including means responsive to code pulses of current of said given voice frequency, said coding means including a code following relay and a battery, and circuit means to connect said relay to said detector and to connect the last mentioned battery to said line circuit through a contact of said relay.

4. In combination, an office, several stations spaced apart to one side of the office, a two-wire line circuit extending from the office through said stations, a station calling means at said office and including a source of direct current and a coding device, said calling means being connected to said line circuit and operable for supplying pulses of direct current of different codes, a selector at each of the stations, each said selector connected to said line circuit and including means responsive to pulses of direct current of a code individual for the respective station, carrier telephone equipments one at each of said stations and each equipment including a transmitter and a receiver, each said transmitter having an input and an output circuit and including means for supplying a carrier telephone current to its output circuit in response to a voice frequency current supplied to its input circuit, each said receiver having an input and an output circuit and including means for supplying a voice frequency current to its output circuit in response to a carrier telephone current supplied to its input circuit, a transmitting medium of carrier telephone current common to all of said stations and exclusive of said two-wire line circuit, each said carrier telephone equipment having the output circuit of its transmitter and the input circuit of its receiver electrically coupled to said transmitting medium, circuit means at each said station and including circuit controller contacts which are operable to a given position to connect the input circuit of the transmitter and the output circuit of the receiver of the same station to said line circuit, additional station calling means including a first code following relay at each of said stations except the station most remote from the office and a second code following relay and coding means at each of said stations except the station nearest the office, each said first code following relay connected in multiple with the input circuit of the transmitter at the same station and being provided with a contact which is included in a circuit that is connected to the transmitter to code the current supplied by that transmitter to said transmitting medium, each said second code following relay connected to the receiver at the same station, and each said coding means including a source of direct current and contacts of the second code following relay at the same station and having connection to said two-wire line circuit.

PAUL N. BOSSART.
ELBERT W. MARLOWE.

(References on following page)

REFERENCES CITED

The following references are of record in the file of this patent:

UNITED STATES PATENTS

| Number | Name | Date |
|---|---|---|
| 1,746,808 | Wolfe | Feb. 11, 1930 |
| 1,758,570 | Gauthier | May 13, 1930 |
| 1,780,921 | Horton | Nov. 11, 1930 |
| 1,902,817 | Affel | Mar. 28, 1933 |
| 1,933,795 | Espenschied | Nov. 7, 1933 |
| 1,934,423 | Green | Nov. 7, 1933 |
| 2,108,909 | Vincent | Feb. 22, 1938 |
| 2,279,697 | Terroni | Apr. 14, 1942 |
| 2,294,905 | Honaman | Sept. 8, 1942 |
| 2,387,146 | Haberl | Oct. 16, 1945 |
| 2,393,291 | Clark | Jan. 22, 1946 |